US008351199B2

(12) United States Patent
Tian et al.

(10) Patent No.: US 8,351,199 B2
(45) Date of Patent: Jan. 8, 2013

(54) COMPUTER CASE WITH DEHUMIDIFICATION

(75) Inventors: Fang Tian, Shenzhen (CN); Zhi-Chun Liang, Shenzhen (CN); Xiang-Wei He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 246 days.

(21) Appl. No.: 12/972,501

(22) Filed: Dec. 19, 2010

(65) Prior Publication Data

US 2012/0020015 A1 Jan. 26, 2012

(30) Foreign Application Priority Data

Jul. 23, 2010 (CN) .......................... 2010 1 0234750

(51) Int. Cl.
*H05K 7/20* (2006.01)
(52) U.S. Cl. ......... 361/679.48; 361/679.02; 361/679.46; 361/688; 361/690; 361/695; 361/679.49
(58) Field of Classification Search .................. None
See application file for complete search history.

(56) References Cited

U.S. PATENT DOCUMENTS

| | | | | |
|---|---|---|---|---|
| 5,504,924 A | * | 4/1996 | Ohashi et al. | 361/676 |
| 6,276,448 B1 | * | 8/2001 | Maruno | 165/185 |
| 7,659,695 B2 | * | 2/2010 | Faisy | 320/115 |
| 7,905,096 B1 | * | 3/2011 | Campbell et al. | 62/93 |

* cited by examiner

*Primary Examiner* — Boris Chervinsky
(74) *Attorney, Agent, or Firm* — Altis Law Group, Inc.

(57) ABSTRACT

An exemplary computer case includes an external shell, a circuit board received in the external shell, and a dehumidification device. The circuit board includes a PCI socket providing an auxiliary power supply when the computer shuts down but the computer case retains electrical connection with an external AC power source. The dehumidification device includes a dehumidification card received in the PCI socket for obtaining the auxiliary power supply therefrom and a remote device. The dehumidification card includes a fan for generating airflow to remove moisture from the computer case and a sensor detecting a humidity inside the computer case. The remote device includes a display unit for displaying the result. When the humidity exceeds a predetermined value, the computer is not powered up until the fan evacuates the excess moisture from the computer case and the humidity falls below the predetermined value.

20 Claims, 5 Drawing Sheets

COMPUTER CASE WITH DEHUMIDIFICATION

BACKGROUND

1. Technical Field

The present disclosure relates to a computer case with an arrangement which can provide dehumidification even when the computer is turned off.

2. Description of Related Art

A personal computer frequently includes a computer case, and a circuit board and a fan received in the computer case. The circuit board includes a sensor which can detect the humidity of the interior of the computer case, and a CPU (Central Processing Unit) which controls the fan and thereby manages dehumidification in the computer case. During use, the sensor detects the humidity of the computer case, and the CPU compares the humidity with a preset value. If the humidity exceeds the preset value, the CPU sends a control signal to the fan to rotate at a high speed to exhaust atmospheric moisture and heat from the computer case. If the humidity is lower than the preset value, the CPU sends a control signal to the fan to rotate at a relatively low speed to only remove heat from the computer case.

However, the components of the circuit board can only perform dehumidification when the computer is running. When the computer is shut down for a period of time, especially under damp conditions, the humidity within the computer case can become very high. If the computer is started at such a time, failure to start, or even damage to electronic components, can occur.

It is thus desirable to provide a computer which can overcome the described limitations.

DETAILED DESCRIPTION

Figure 1:
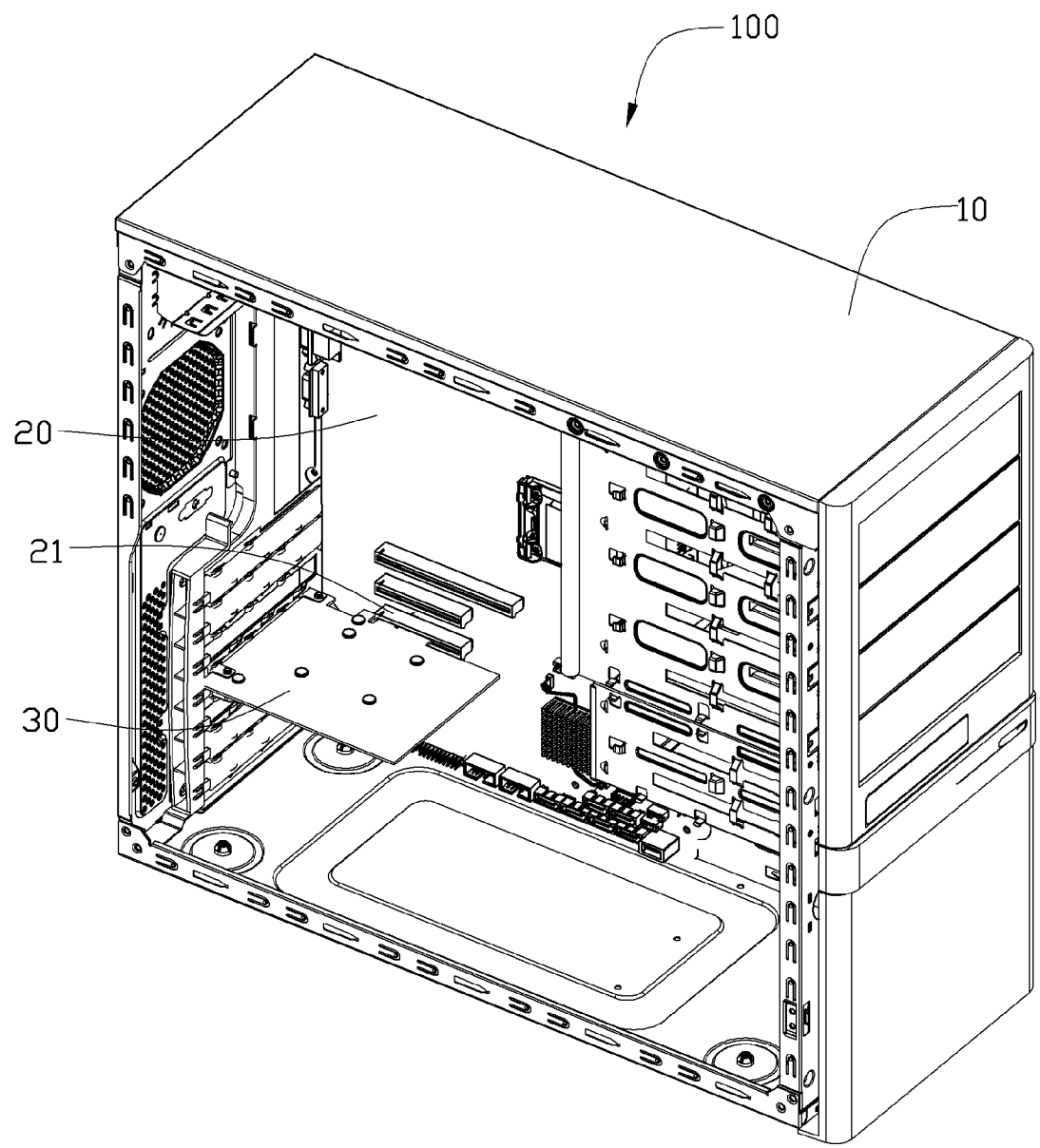
FIG. 1 is an isometric, assembled view of a computer case according to an exemplary embodiment of the present disclosure.

Reference will now be made to the drawing figures to describe at least one embodiment in detail.

Figure 2:
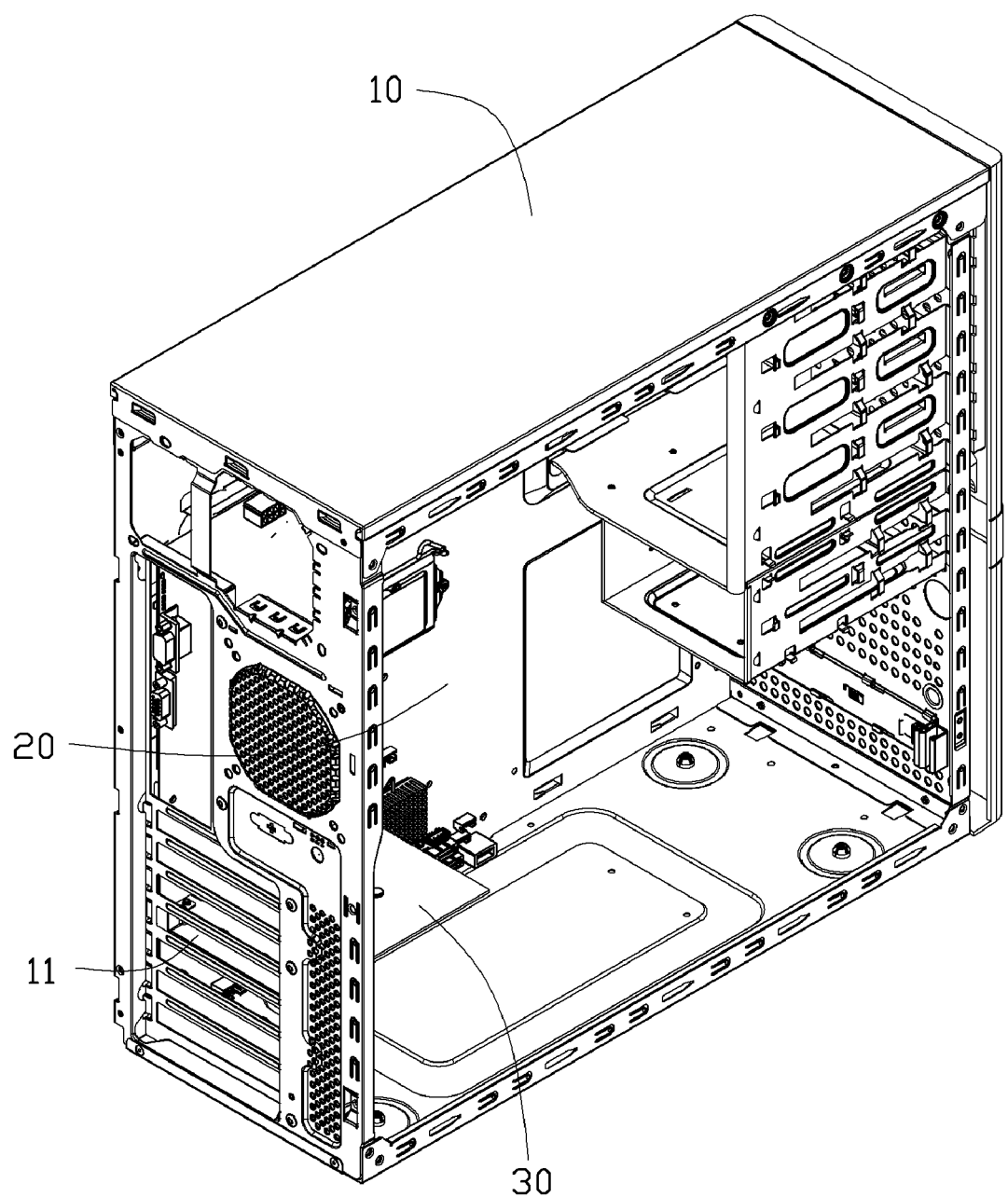
FIG. 2 is a view similar to FIG. 1, but with the computer case shown from another aspect.
Figure 3:
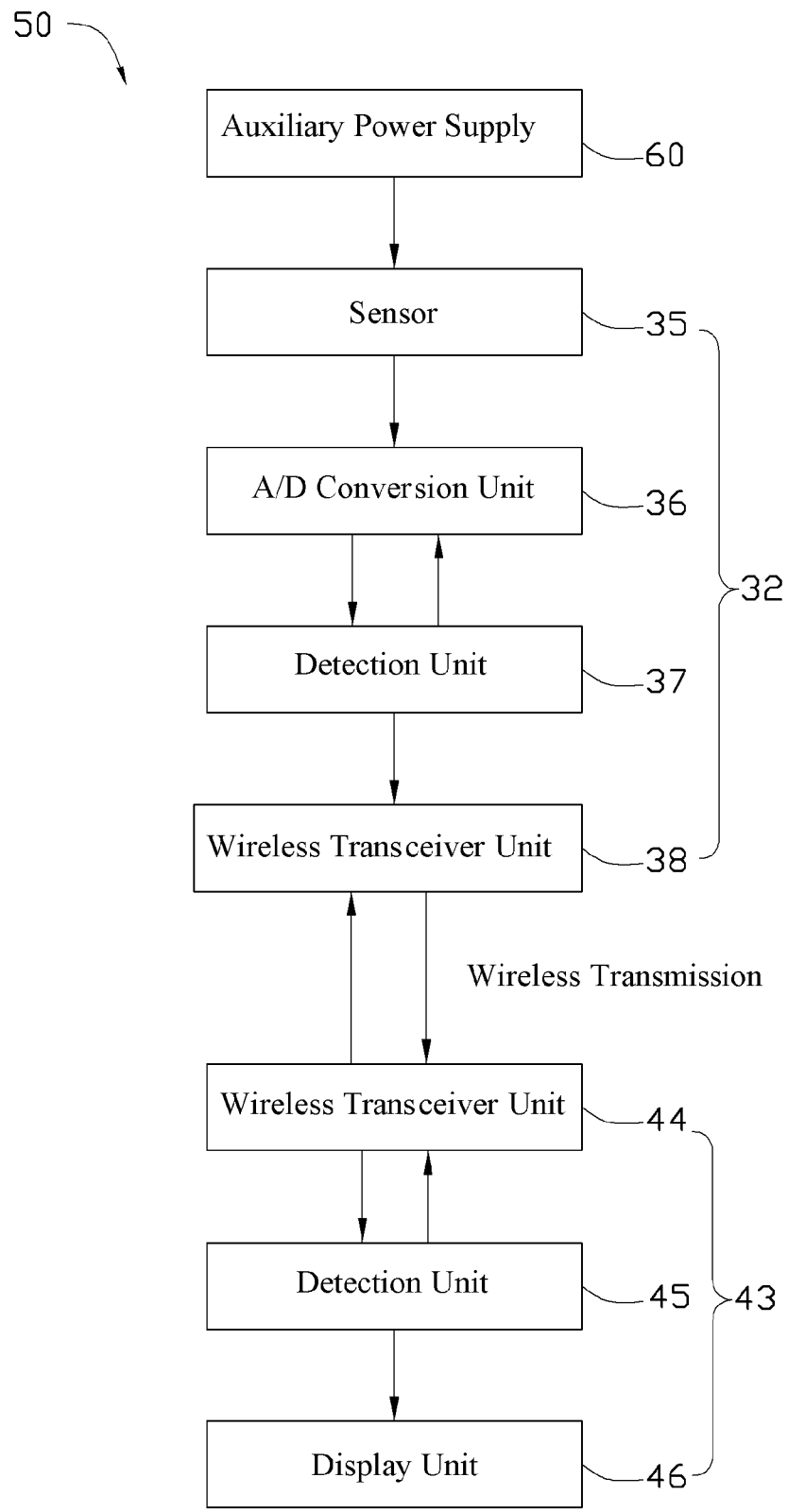
FIG. 3 is a functional block view of a dehumidification device of the computer case of the exemplary embodiment.
Figure 4:
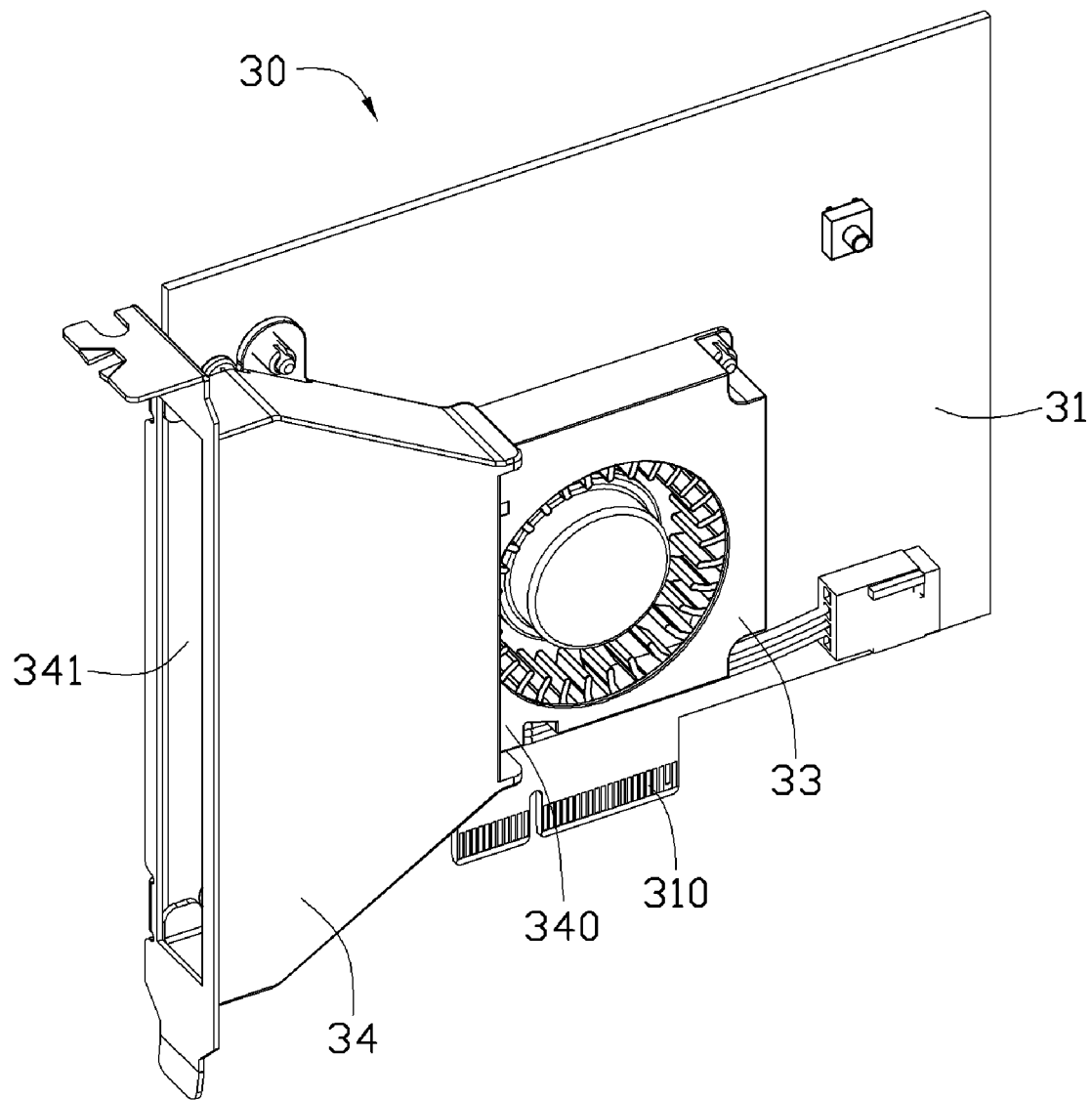
FIG. 4 is an isometric, assembled view of a dehumidification card of the dehumidification device of the computer case of the exemplary embodiment.
Figure 5:
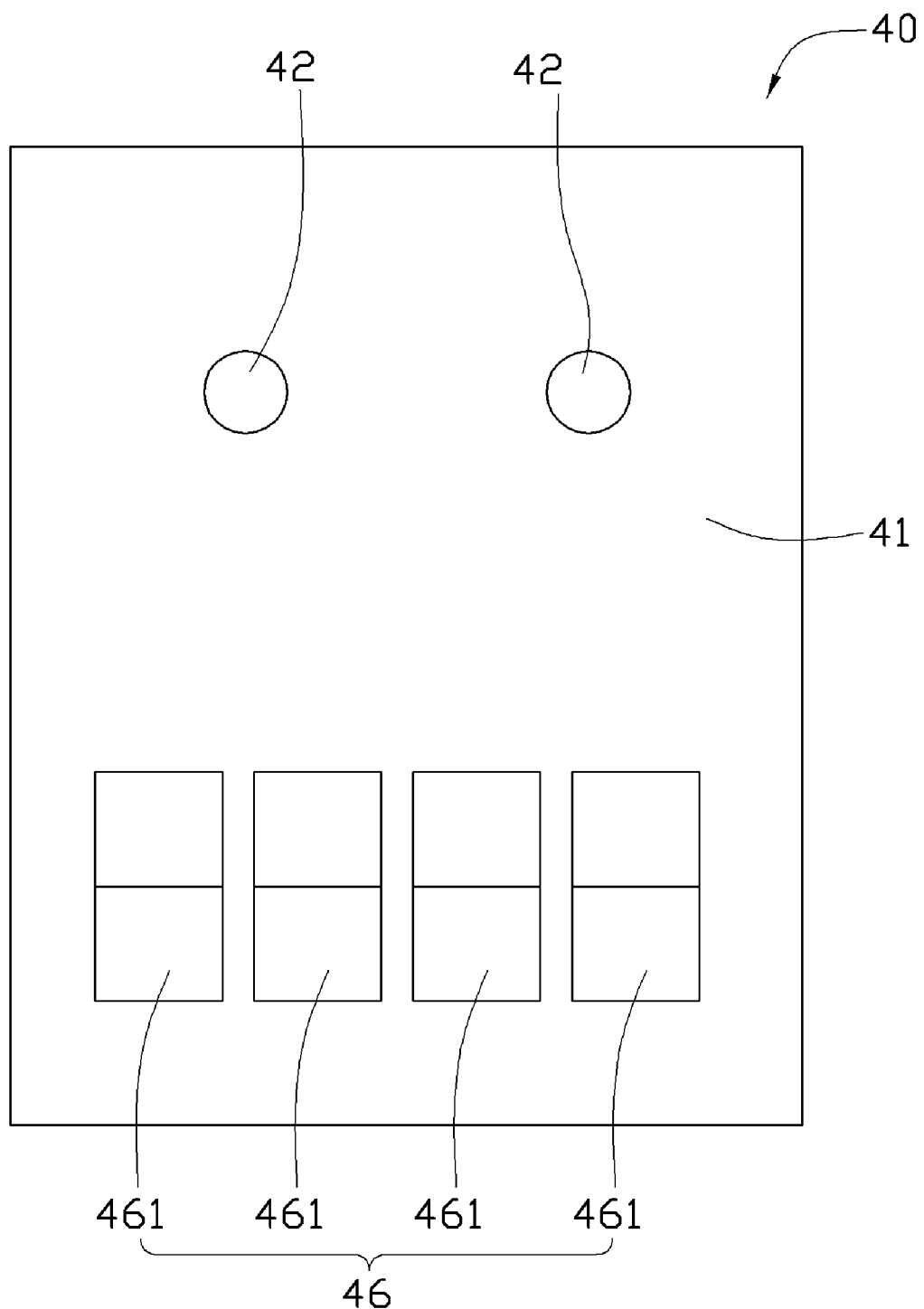
FIG. 5 is a schematic view of a remote device of the dehumidification device of the computer case of the exemplary embodiment.

Referring to FIGS. 1-3, a computer case 100 according to an exemplary embodiment of the present disclosure includes an external shell 10, a circuit board 20 received in the external shell 10, and a dehumidification device 50. The circuit board 20 is mounted on one side of an inner surface of the external shell 10, and has a plurality of PCI (Peripheral Component Interconnect) sockets 21 located thereon. Referring also to FIGS. 4-5, the dehumidification device 50 includes a dehumidification card 30 received in the external shell 10, and a remote device 40.

Referring to FIGS. 3-4, the dehumidification card 30 includes a main body 31 with a PCI interface 310 at a periphery thereof, a transmission circuit 32 layered in the main body 31, and a fan 33 and a fan duct 34 mounted on one side of the main body 31. The fan 33 defines a rectangular air outlet at one lateral side thereof. The fan duct 34 defines a first opening 340 and a second opening 341 larger than the first opening 340 at two opposite ends thereof. That is, the fan duct 34 is tapered, with a width thereof increasing from the first opening 340 towards the second opening 341. The first opening 340 connects the air outlet of the fan 33, and the second opening 341 is aligned with another periphery of the main body 31 perpendicular to the periphery on which the PCI interface 310 is formed.

A cutout 11 (see FIG. 2) aligned with the second opening 341 of the fan duct 34 is defined in one side of the external shell 10. The dehumidification card 30 is received in one of the PCI sockets 21 of the circuit board 20, and provides an auxiliary power supply 60 when the computer case 100 electrically connects with an external AC (alternating current) power source (not shown). Thus, the dehumidification card 30 is powered from the circuit board 20 when the computer is shut down but an electrical connection between the computer case 100 and the external AC power source is maintained. The transmission circuit 32 includes a sensor 35, an analog to digital (A/D) conversion unit 36, a detection unit 37, and a wireless transceiver unit 38.

The sensor 35 is a humidity sensor detecting a humidity of an interior of the computer case 100, and outputting the result of detection to the A/D conversion unit 36. Such a humidity sensor may be an AD590 one, as known in the art. The humidity detected by the sensor 35 is read as an analog signal. The A/D conversion unit 36 receives the detection analog signal from the sensor 35, converts the detection analog signal to a digital result, and outputs the digital result to the detection unit 37. Such an A/D conversion unit 36 may be an MC14433 one, as known in the art.

The detection unit 37 is a programmable logic controller, which has a program set therein. The detection unit 37 receives the digital result from the A/D conversion unit 36, and then processes the digital result according to the set program. More specifically, the detection unit 37 compares the digital result received from the A/D conversion unit 36 with a preset value to judge whether the digital result is acceptable or not. If the digital result is acceptable (i.e., is a valid value to indicate the humidity of the computer case 100), the detection unit 37 records the digital result and then outputs the digital result to the wireless transceiver unit 38. If the digital result is not acceptable (i.e., is abnormal because, for example, distortion occurred when the A/D conversion unit 36 converted the detection analog signal from the sensor 35 to the digital result), the detection unit 37 outputs a feedback signal to direct the A/D conversion unit 36 to convert the detection analog signal from the sensor 35 to a digital result again and output the newer digital result to the detection unit 37. The detection unit 37 acquires the newer digital result from the A/D conversion unit 36, and compares the newer digital result with the preset value. If the newer digital result is acceptable (i.e., is a valid value to indicate the humidity of the computer case 100), the detection unit 37 records the newer digital result and then outputs the newer digital result to the wireless transceiver unit 38. Such a detection unit 37 may be an 89C51 one, as known in the art.

The wireless transceiver unit 38 includes a single mode emitter chip which can send the digital result to the remote device 40 by wireless transmission. Such a wireless transceiver unit 38 may include an MICRF102 unit, as known in the art.

The remote device 40 is disposed out of the computer case 100, and includes an enclosure 41, a pair of controls 42 located at the top surface of the enclosure 41, and a receiving circuit 43 received in the enclosure 41. One of the controls 42 is configured to turn on the dehumidification device 50, and the other is configured to turn off the dehumidification device 50. The receiving circuit 43 includes a wireless transceiver unit 44, a detection unit 45, and a display unit 46. The wireless transceiver unit 44 includes a single mode receiver chip, which can receive the digital result of humidity from the wireless transceiver unit 38 of the transmission circuit 32 and then output the digital result to the detection unit 45. Such a wireless transceiver unit 44 may include an MICRF007 unit, as known in the art.

The detection unit 45 has a similar function to the detection unit 37 of the transmission circuit 32. More specifically, the detection unit 37 compares the digital result received from the wireless transceiver unit 44 with a preset value to determine whether the digital result is acceptable or not. If the digital result is not acceptable (i.e., is abnormal because, for example, distortion occurred due to an interference signal when the digital result was received by the wireless transceiver unit 44), the detection unit 45 outputs a feedback signal to direct the wireless transceiver unit 44 to receive the digital result from wireless transceiver unit 38 of the transmission circuit 32 again. If the digital result is acceptable (i.e., is a valid value to indicate the humidity of the computer case 100), the detection unit 45 records the digital result and then outputs the digital result to the display unit 46. Such a detection unit 45 may be an 89C51 one, as known in the art.

The display unit 46 displays the humidity measurement thereon. The display unit 46 includes four digital tubes 461 arranged on the top surface of the enclosure 41. Each digital tube 461 can for example be a rectilinear-type LCD array, which is capable of displaying any of the digits from zero to nine in the form of an angular numeral. Thus in FIG. 5, if all five LCD lines of any one digital tube 461 are illuminated, such digital tube 461 is displaying the numeral 8. In this way, the digital tubes 461 show a reading of the humidity.

When the computer case 100 is in use, after the computer case 100 is in electrical connection with the AC external power source and before the computer is turned on, one of the controls 42 of the remote device 40 is operated by a user to turn on the dehumidification device 50. The dehumidification card 30 detects the humidity of the computer case 100 and sends the result to the remote device 40. Then the remote device 40 displays the humidity measurement on the display unit 46. Simultaneously, the fan 33 mounted on the dehumidification card 30 rotates, to generate airflow to remove moisture from the computer case 100. If the humidity measurement displayed on the remote device 40 exceeds a predetermined threshold value at which damage may be caused to electronic components, the fan 33 is allowed to evacuate moisture from the computer case 100 until the humidity measurement displayed on the display unit 46 falls below than the predetermined value. If the humidity measurement displayed on the remote device 40 is lower than the predetermined value, the computer is allowed to turn on (power up) immediately and safely.

It is to be understood, however, that even though numerous characteristics and advantages of the embodiment(s) have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer case comprising:
   an external shell;
   a circuit board received in the external shell, the circuit board comprising a Peripheral Component Interconnect (PCI) socket for providing an auxiliary power supply when the computer is shut down while the computer still maintains electrical connection with an external alternating current (AC) power source; and
   a dehumidification device comprising:
      a dehumidification card received in the PCI socket for obtaining the auxiliary power supply therefrom, the dehumidification card comprising:
         a fan for generating airflow to remove at least moisture from the computer case; and
         a transmission circuit comprising a sensor for detecting a humidity inside the computer case and a wireless transceiver unit for sending a result of the detection to the remote device; and
      a remote device comprising:
         a wireless transceiver unit for receiving the detection result from the wireless transceiver unit of the transmission circuit; and
         a display unit for displaying the detection result;
   wherein when the humidity exceeds a predetermined threshold value, the computer is not powered up until the fan evacuates the excess moisture from the computer case and the humidity falls below the predetermined threshold value.

2. The computer case of claim 1, wherein the transmission circuit further comprises an A/D conversion unit and a detection unit, wherein the humidity detected by the sensor is read as an analog signal, and the A/D conversion unit converts the analog signal to a digital result and outputs the digital result to the detection unit, the detection unit processing the digital result and then outputting the digital result to the wireless transceiver unit of the transmission circuit.

3. The computer case of claim 2, wherein the sensor is a humidity sensor.

4. The computer case of claim 2, wherein the detection unit is a programmable logic controller which has a program set therein, the detection unit comparing the digital result received from the A/D conversion unit with a preset value to determine whether the digital result is acceptable or not according to the set program, and wherein if the digital result is not acceptable, the detection unit outputs a feedback signal to direct the A/D conversion unit convert the analog signal from the sensor to the digital result again and output the newer digital result to the detection unit; if the digital detection result is acceptable, the detection unit records the digital result and then outputs the digital result to the wireless transceiver unit of the transmission circuit.

5. The computer case of claim 1, wherein the dehumidification card further comprises a fan duct located at one side of the fan, the fan duct comprising a first opening connecting an air outlet of the fan and a second opening, and a cutout aligned with the second opening is defined in the computer case.

6. The computer case of claim 1, wherein the remote device further comprises a detection unit connected between the wireless transceiver unit of the remote device and the display unit, the detection unit receiving the digital result from the wireless transceiver unit of the transmission circuit, processing the digital result and then outputting the digital result to the display unit.

7. The computer case of claim 6, wherein the detection unit is a programmable logic controller which has a program set therein, the detection unit comparing the digital result received from the wireless transceiver unit of the remote device with a preset value to determine whether the digital result is acceptable or not according to the set program, and wherein if the digital result is not acceptable, the detection unit outputs a feedback signal to direct the wireless transceiver unit of the remote device to receive the digital result from the wireless transceiver unit of the transmission circuit again; if the digital result is acceptable, the detection unit records the digital result and outputs the digital result to the display unit.

8. The computer case of claim 6, wherein the remote device comprises an enclosure with a plurality of digital tubes located at one side surface thereof.

9. A computer case comprising:
an external shell;
a circuit board received in the external shell, the circuit board comprising a Peripheral Component Interconnect (PCI) socket for providing an auxiliary power supply when the computer shuts down but with the computer case still retaining electrical connection with an external alternating current (AC) power source; and
a dehumidification device comprising a dehumidification card received in the PCI socket for obtaining the auxiliary power supply therefrom and a remote device, the dehumidification card comprising a fan for generating airflow to remove at least moisture from the computer case and a sensor for detecting a humidity inside the computer case, the remote device comprising a display unit for displaying a result of the detection;
wherein when the humidity exceeds a predetermined threshold value, the computer is not powered up until the fan evacuates the excess moisture from the computer case and the humidity falls below the predetermined threshold value.

10. The computer case of claim 9, wherein the dehumidification card comprises a main body with a PCI interface at a periphery thereof and a transmission circuit layered in the main body, the transmission circuit comprising an A/D conversion unit, a detection unit and a wireless transceiver unit electrically connected to the sensor, the humidity detected by the sensor is read as an analog signal, the A/D conversion unit converts the analog signal to digital result and outputs the digital result to the detection unit, the detection unit processes the digital result and then outputs the digital result to the wireless transceiver unit, and the wireless transceiver unit transmits the digital result to the remote device.

11. The computer case of claim 10, wherein the sensor is a humidity sensor.

12. The computer case of claim 10, wherein the detection unit is a programmable logic controller which has a program set therein, the detection unit compares the digital result received from the A/D conversion unit with a preset value to determine whether the digital detection result is acceptable or not according to the set program, and wherein if the digital result is not acceptable, the detection unit outputs a feedback signal to direct the A/D conversion unit convert the analog signal from the sensor to the digital result again and output the newer digital result to the detection unit; if the digital detection result is acceptable, the detection unit records the digital result and then outputs the digital result to the wireless transceiver unit.

13. The computer case of claim 10, wherein the remote device further comprises another wireless transceiver unit for receiving the digital result from the wireless transceiver unit of the transmission circuit and a detection unit connected between the another wireless transceiver unit and the display unit, the detection unit receiving the digital result from the another wireless transceiver unit, processing the digital result and then outputting the digital result to the display unit.

14. The computer case of claim 13, wherein the detection unit is a programmable logic controller which has a program set therein, the detection unit comparing the digital result received from the another wireless transceiver unit of the receiving circuit with a preset value to determine whether the digital result is acceptable or not according to the set program, and wherein if the digital result is not acceptable, the detection unit outputs a feedback signal to direct the another wireless transceiver unit of the receiving circuit to receive the digital result from the wireless transceiver unit of the transmission circuit again; if the digital result is acceptable, the detection unit records the digital result and outputs the digital result to the display unit.

15. The computer case of claim 14, wherein the display unit comprises a plurality of digital tubes for showing the result of the detection.

16. A computer dehumidification arrangement comprising:
a circuit board comprising a Peripheral Component Interconnect (PCI) socket for providing an auxiliary power supply when a computer is shut down while the computer still maintains electrical connection with an external alternating current (AC) power source; and
a dehumidification device comprising a dehumidification card received in the PCI socket for obtaining the auxiliary power supply therefrom;
the dehumidification card comprising:
a fan for generating airflow to remove at least moisture from an inside of the computer; and
a transmission circuit comprising a sensor for detecting a humidity of the inside of the computer and a wireless transceiver unit for sending a result of the detection to a remote device;
the remote device comprising:
a wireless transceiver unit for receiving the detection result from the wireless transceiver unit of the transmission circuit; and
a display unit for displaying the result of the detection;
wherein when the humidity exceeds a predetermined threshold value, the computer is not powered up until the fan evacuates the excess moisture from the computer and the humidity falls below the predetermined threshold value.

17. The computer dehumidification arrangement of claim 16, wherein the dehumidification card comprises a main body with a PCI interface at a periphery thereof, the transmission circuit being layered in the main body, the transmission circuit further comprising an A/D conversion unit electrically connected to the sensor and a detection unit electrically connected to the A/D conversion unit, and wherein the humidity detected by the sensor is read as an analog signal, the A/D conversion unit converts the analog signal to a digital result and outputs the digital result to the detection unit, the detection unit processes the digital result and then outputs the digital result to the wireless transceiver unit of the transmission circuit.

18. The computer dehumidification arrangement of claim 17, wherein the detection unit is a programmable logic controller which has a program set therein, the detection unit compares the digital result received from the A/D conversion unit with a preset value to determine whether the digital detection result is acceptable or not according to the set program, and wherein if the digital result is not acceptable, the detection unit outputs a feedback signal to direct the A/D conversion unit convert the analog signal from the sensor to the digital result again and output the newer digital result to the detection unit; if the digital detection result is acceptable, the detection unit records the digital result and then outputs the digital result to the wireless transceiver unit of the transmission circuit.

19. The computer dehumidification arrangement of claim 17, wherein the remote device further comprises a detection unit connected between the wireless transceiver unit of the remote device and the display unit, the detection unit receiving the digital result from the wireless transceiver unit of the remote device, processing the digital result and then outputting the digital result to the display unit.

20. The computer dehumidification arrangement of claim 19, wherein the detection unit is a programmable logic controller which has a program set therein, the detection unit comparing the digital result received from the wireless transceiver unit of the remote device with a preset value to determine whether the digital result is acceptable or not according to the set program, and wherein if the digital result is not acceptable, the detection unit outputs a feedback signal to direct the wireless transceiver unit of the remote device receives the digital result from the wireless transceiver unit of the transmission circuit again; if the digital result is acceptable, the detection unit records the digital result and outputs the digital result to the display unit, the display unit comprising a plurality of digital tubes for showing the result of the detection.

* * * * *